Oct. 27, 1964  J. F. PAULSEN  3,154,273
RESILIENT CONNECTING DEVICES
Filed Jan. 18, 1962  4 Sheets-Sheet 1

Oct. 27, 1964   J. F. PAULSEN   3,154,273
RESILIENT CONNECTING DEVICES
Filed Jan. 18, 1962   4 Sheets-Sheet 3

INVENTOR

BY

ATTORNEY

INVENTOR

BY

ATTORNEY

United States Patent Office 3,154,273
Patented Oct. 27, 1964

3,154,273
RESILIENT CONNECTING DEVICES
Jean Félix Paulsen, Paris, France, assignor to Luxembourgeoise de Brevets et de Participations, a society of Belgium
Filed Jan. 18, 1962, Ser. No. 167,032
Claims priority, application France, Jan. 26, 1961, 850,854
4 Claims. (Cl. 248—22)

The present invention relates to devices for resiliently connecting together two structures subjected to the action of forces tending to move them with respect to each other (in particular in order to damp their relative oscillations), one of said structures having, fixed or integral therewith, a first rigid member of annular shape and the other of said structures having, fixed or integral therewith, a second rigid member of elongated shape, mounted coaxially with respect to said annular member and extending therethrough, said second member including two abutments located at a distance from each other in the axial direction of said second member and on opposite sides, respectively, of said annular member, the device further comprising masses of rubber or another elastomer fixed respectively to said two rigid members so as to limit a closed space which is filled with a liquid intended to have a damping action.

The object of this invention is to provide a device of this kind which is better adapted to meet the requirements of practice than those known up to this time, in particular concerning efficiency and simplicity of construction.

The invention consists chiefly in giving said masses of rubber or another elastomer, the form of two bags bulging outwardly and the deformable portions of which are disposed between said annular rigid member and the abutments of the second rigid member, on opposite sides of said annular rigid member, so that these bags portions may be deformed both radially and axially.

According to a first embodiment of the invention, to be used more particularly for the suspension of relatively light structures, the rubber or elastomer masses constitute a bellows, preferably in the form of a surface of revolution, comprising at least two bulging portions connected together by a throat applied against the inner wall of the annular rigid member, the damping action of the liquid, which may have a low viscosity, being ensured by causing it to flow through a throttled passage provided at the level of said throat.

According to a second embodiment of the invention, to be used more particularly for the suspension of relatively heavy structures, the masses of rubber or another elastomer constitute two mushroom-shaped elements disposed axially in opposed relation to each other with their apexes located against said abutments, respectively, and their open ends fixed to said annular rigid member, the damping action of the liquid, which must be of high viscosity, being obtained by viscous shearing thereof.

Preferred embodiments of this invention will be hereinafter described with reference to the appended drawings, given merely by way of example, and in which.

Figure 6:
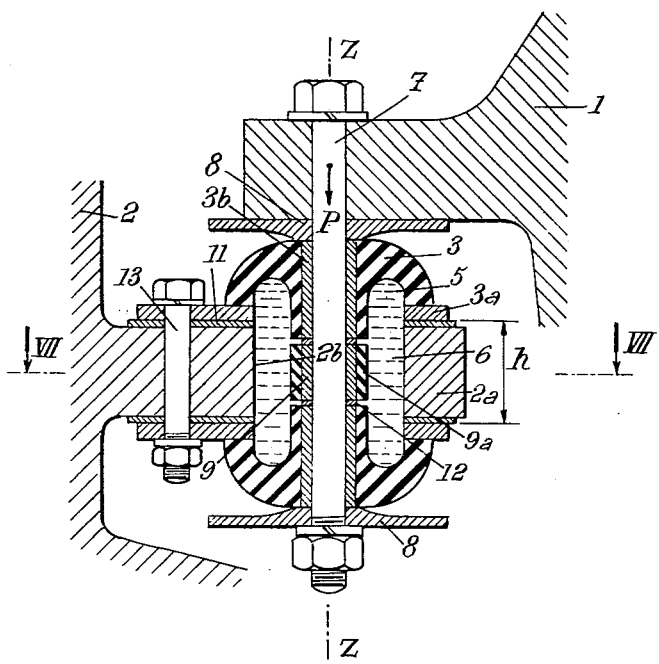
FIG. 6 is a vertical axial section of a resilient connecting device made according to a second embodiment of the invention.
Figure 7:
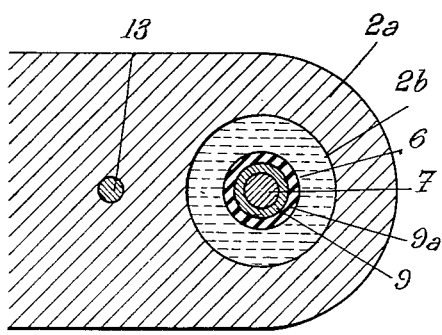
FIG. 7 is a horizontal section on the line VII—VII of FIG. 6.
Figure 8:
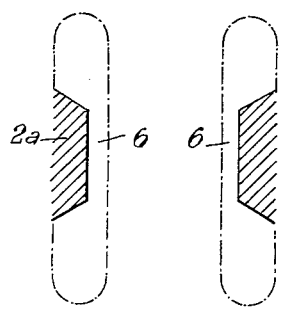
Figure 9:
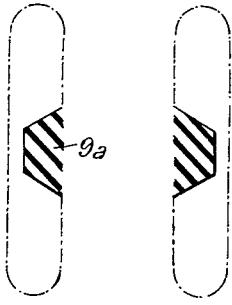
Figure 10:
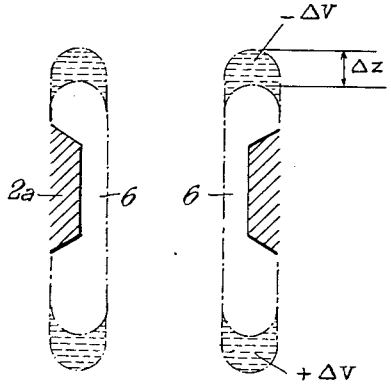
Figure 11:
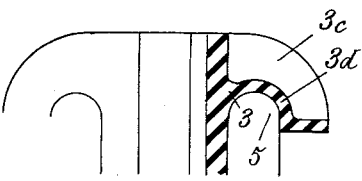
Figure 12:
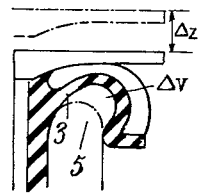

FIGS. 8, 9 and 10 diagrammatically show three modifications of the device of FIGS. 6–7, respectively;

FIGS. 11 and 12 are part sectional views of still another modification, shown in two different positions respectively.

In the following description the two structures to be connected together are designated by 1 and 2 respectively, structure 1 being for instance a machine to be supported by a frame 2. The connecting device according to this invention is interposed between these structures 1 and 2 so as to damp the relative displacements of machine 1 with respect to frame 2.

Structure 2 carries, integral therewith, an annular rigid member $2_a$ limiting a circular aperture $2_b$ (FIGS. 1, 2, 6 and 7). The other structure 1 carries, fixed with respect thereto, two abutments 8 disposed opposite each other along the axis of aperture $2_b$, on opposite sides of annular member $2_a$, respectively.

Masses 3 of rubber or another elastomer are interposed between annular member $2_a$ and abutments 8 so as to limit a closed space filled with a liquid 5.

But instead of making said masses in the form of rings compressed inside the annular member, as it was done in prior devices, said masses consist of bags bulging outwardly and the deformable portions of which extend between annular member $2_a$ and abutments 8, respectively.

Said deformable portions are thus capable of deforming freely in all directions so that the suspension device has a very good flexibility both radially and axially.

Of course when structure 1 moves axially with respect to structure 2, one of the resilient bags is caused to retract while the other expands.

These deformations of the resilient bags produce corresponding displacements of the liquid contained therein, which displacements permit of damping the relative movements of structures 1 and 2 in one of the two following manners:

(a) A throttled passage for the flow of the liquid from the inside of one bag to the inside of the other is provided at the level of the annular member and in this case the liquid may be chosen relatively fluid (consisting for instance of one of the oils usually employed in braking or damping hydraulic circuits, or of a silicone oil which is particularly inert with respect to rubber);

(b) A viscous shearing is created by friction of the different layers of liquid against one another, said liquid being then chosen relatively viscous (and consisting for instance of at least one polyisobutylene having a molecular weight ranging from 5,000 and 12,000 with reference to the atomic weight of oxygen being taken as equal to 16).

It may be further noted that the relative radial displacements of the two structures are also damped by the corresponding radial displacements of the liquid.

Advantageously, as shown, the two abutments 8 carried by structure 1 are connected together by a system 7 comprising a bolt and a nut extending axially through the deformable closed space where the liquid is contained. However this arrangement is obviously not the only possible one.

The different embodiments of this invention illustrated by the drawings will now be described separately.

Figure 1:
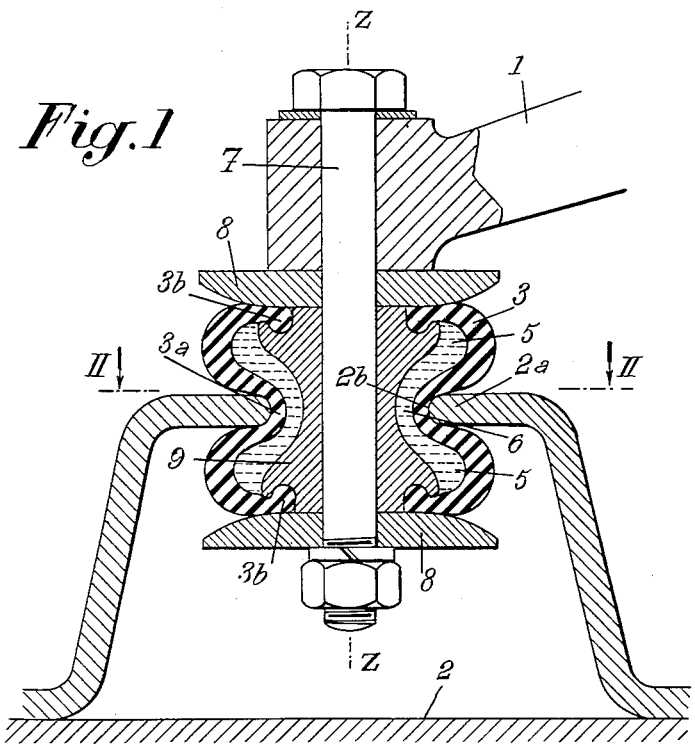
FIG. 1 is a vertical axial section of a resilient connecting device made according to a first embodiment of the invention.
Figure 2:
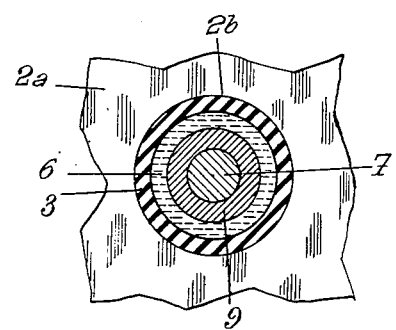
FIG. 2 is a horizontal section of this device on the line II—II of FIG. 1.

In the embodiment of FIGS. 1 and 2, bags 3 consist of portions of a bellows, preferably in the form of a surface of revolution, made of rubber or any other suitable elastomer, this bellows comprising two bulging portions connected together by a throat $3_a$ which is inserted in the aperture $2_b$ of annular member $2_a$.

This bellows is fixed through two end reinforcements $3_b$ to abutments 8 by means of a core 9 surrounding bolt 7 and which squeezes said reinforcement $3_b$ against said abutments 8.

Core 9 has an axial outer section of a shape corresponding to that of the bellows, so as to leave between itself and said bellows an annular throttled passage 6.

Figure 3:
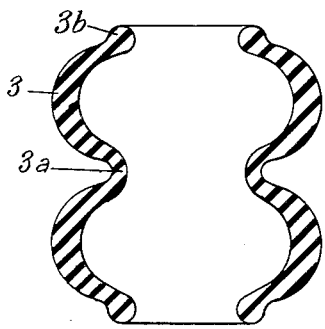
FIG. 3 is an axial section of a bellows, in its state of rest to be used in the device of FIGS. 1 and 2.
Figure 4:
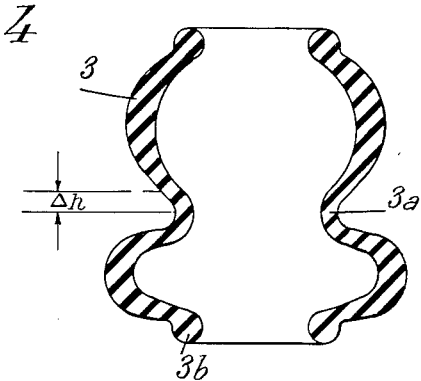
FIG. 4 is a view similar to FIG. 3 but showing a modification.

FIGS. 3 and 4 separately show the bellows, according to two different modifications.

In the case of FIG. 3, the bellows, before it is assembled with the other parts, is symmetrical with respect to its throat $3_a$, this arrangement being suitable when the static load is low.

In the case of FIG. 4, on the contrary, the bellows is of non-symmetrical shape, this solution being preferable when the static load has a substantial value. When the device is assembled and subjected to the load applied by structure 1, symmetry is restored after a deformation of an amplitude $\Delta h$.

Such a device works as follows:

For any relative displacement of structure 1 with respect to structure 2 in the direction ZZ, one of the halves of bellows 3 is caused to expand while the other one is caused to retract, the two resilient reactions of the deformable wall of these bellows portions being added to each other to create the total resilient force of suspension, this movement further bringing into play the damping effect (of low value) of the elastomer.

Simultaneously the retracted portion of bellows 3 forces liquid through throttled passage 6 into the other portion of the bellows, which has expanded.

The resistance to the flow of the liquid through throttled passage 6 creates a damping effort of important value opposed to the displacement and which is added to the damping of the resilient material of bellows 3.

The supplementary damping thus created may be adjusted at will by a suitable choice of the viscosity of the liquid and of the size of passage (or passages) 6. In the construction illustrated by FIG. 1 passage 6 is annular but of course the invention is not limited to such an arrangement.

Figure 5:
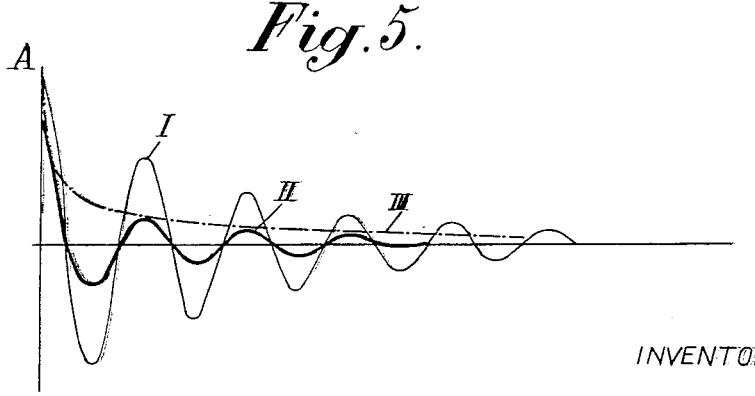
FIG. 5 is a diagram illustrating the operation of device.

FIG. 5 shows three different curves:

Curve I represents the damping obtained in the case of a resilient suspension without damping. Equilibrium is restored after a great number of oscillations of gradually decreasing amplitude.

Curve II shows the damping obtained with the device according to this invention, with a moderately viscous liquid, the number of oscillations being reduced and their amplitude decreasing very quickly.

Finally, FIG. 3 shows the aperiodic damping obtained by the use either of a sufficiently viscous liquid or a sufficiently small cross section area of passage 6.

In the construction illustrated by FIGS. 6 and 7, damping is ensured by the viscosity of the liquid, without throttling thereof.

The bag portions 3 are in the form of mushrooms the stems of which are fixed (caused to adhere) to sleeves $3_b$ coaxially surrounding bolt 7. The outer portions of said bags 3 are similarly fixed to intermediate elements $3^a$, in the form of plates fixed by bolts 13 on annular member $2_a$.

Between the stem of these mushroom-shaped bags there is provided a metal sleeve 9 fitted on bolt 7 and covered, over at least a portion of its length, with a rubber sleeve $9_a$ to prevent shocks of metal parts against one another when bolt 7 undergoes radial movements of great amplitude. 11 and 12 are packing means.

In this case also the two chambers formed by the mushroom-shaped bags are connected together by an annular passage 6, but this passage is of relatively great cross section.

This passage 6 however permits the desired damping if the height $h$ of annular member $2_a$ is great and if use is made of a fluid of high viscosity such as one of the polyisobutylenes above referred to.

However, the cross section of passage 6 may be reduced in various manners.

For instance, the diameter of the aperture $2_b$ of annular member $2_a$ may be reduced as shown by FIGS. 8 and 10.

It is also possible to increase the diameter of sleeve 9 or of the rubber sleeve $9_a$ that covers it, as shown by FIG. 9.

With this construction also, when there is a relative displacement $\Delta Z$ (FIG. 10) of the structures the upper volume $-\Delta V$ of liquid passes to the bottom at $+\Delta V$.

According to still another feature of the invention, the resilient material is provided with portions of reduced thickness, so as to create supplementary possibilities of deformation without producing, for small oscillations, a material transfer of liquid from one of the chambers formed by the resilient bags to the other.

For this purpose, when it is designed to have different damping conditions for different frequencies of oscillations and in particular to keep damping at a high value for low frequencies (where resonances occur) and to reduce the damping effect at high frequencies (where they might involve unnecessary vibration of the liquid mass) it is advantageous to make use of arrangements as illustrated by FIGS. 11 and 12.

In this case the rounded walls of the mushroom-shaped bags 3 are made, at places, of reduced thickness by forming recesses therein as shown at $3_c$ whereby at these places the thickness of the walls $3_d$ is considerably reduced to produce a kind of "resilient breathing" (FIG. 12), substracting from the transfer of liquid (therefor from the damping effect) small volumes $\Delta V$ corresponding to small relative displacements $\Delta Z$ at high frequencies.

Whatever be the particular embodiment that is chosen, the connecting device according to this invention permits of obtaining a high damping while using only relatively simple parts.

Of course, the invention is not limited to the particular embodiment above described with reference to the appended drawings and there might be changes made therein without departing from the principle of the present invention.

What I claim is:

1. A device for resiliently connecting together two structures subjected to the action of forces tending to move them with respect to each other, this device comprising, in combination, a first rigid member, of annular shape, fixed with respect to one of said structures, a second rigid member, of elongated shape, fixed with respect to the other of said structures, a portion of said second member being coaxial to said first member and extending therethrough, said second member including two abutments located on opposite sides, respectively, of said first member, a bellows made of an elastomer, said bellows comprising an intermediate throat portion of restricted cross section applied against the inner wall of said annular first member, and two outwardly bulging portions of curvilinear longitudinal section extending on opposite sides of said throat portion respectively, the ends of said bulging portions being fixed to said abutments respectively, so that said bellows limits a closed space, means carried by one of said members for forming a throttled passage along said throat portion between the insides of said bulging portions, and a viscous liquid filling said closed space, whereby damping is obtained by the flow of said liquid past said throttled passage.

2. A device according to claim 1 wherein said second rigid member comprises an axial rod extending between said abutments and a core carried by said rod and cooperating with said bellows to form said throttled passage at the level of said throat portion.

3. A device according to claim 2 wherein the ends of said bellows comprise annular reinforcements tightly held between said core and said reinforcements respectively.

4. A device according to claim 1 wherein the bellows, in the free state, is dissymetrical with respect to its throat, the static load applied to the device having for its effect to make said bellows symetrical when it is assembled with the other parts of the device.

References Cited in the file of this patent

UNITED STATES PATENTS

| | | |
|---|---|---|
| 2,380,899 | Strachovsky | July 31, 1945 |
| 2,432,050 | Thiry | Dec. 2, 1947 |
| 2,502,322 | Iredell | Mar. 28, 1950 |
| 2,538,954 | Efromson et al. | Jan. 23, 1951 |
| 2,562,195 | Lee | July 31, 1951 |
| 2,582,998 | Lee | Jan. 22, 1952 |
| 2,756,016 | Painter | July 24, 1956 |
| 2,781,990 | Via | Feb. 19, 1957 |
| 2,830,833 | Alldredge et al. | Apr. 15, 1958 |
| 2,851,101 | Bachi | Sept. 9, 1958 |
| 2,872,774 | Fink | Feb. 10, 1959 |
| 2,963,259 | Heyer et al. | Dec. 6, 1960 |

FOREIGN PATENTS

| | | |
|---|---|---|
| 255,872 | Great Britain | Feb. 10, 1927 |
| 282,188 | Great Britain | Dec. 22, 1927 |
| 154,936 | Sweden | June 19, 1956 |